US012105578B2

(12) United States Patent
Kim et al.

(10) Patent No.: US 12,105,578 B2
(45) Date of Patent: Oct. 1, 2024

(54) POWER MANAGEMENT METHOD AND APPARATUS FOR AWARENESS OF POWER INSTABILITY SITUATION

(71) Applicant: ELECTRONICS AND TELECOMMUNICATIONS RESEARCH INSTITUTE, Daejeon (KR)

(72) Inventors: Jungsook Kim, Daejeon (KR); Hyunwoo Joe, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 70 days.

(21) Appl. No.: 17/989,796

(22) Filed: Nov. 18, 2022

(65) Prior Publication Data
US 2023/0185358 A1    Jun. 15, 2023

(30) Foreign Application Priority Data

Dec. 7, 2021   (KR) .................. 10-2021-0173614
May 27, 2022   (KR) .................. 10-2022-0065302

(51) Int. Cl.
*G06F 1/00*     (2006.01)
*G06F 1/3296*   (2019.01)

(52) U.S. Cl.
CPC .................. *G06F 1/3296* (2013.01)

(58) Field of Classification Search
CPC .......... G06F 1/3296; G06F 1/28; G06F 1/263; G06F 1/3212; H02J 9/005
See application file for complete search history.

(56) References Cited

U.S. PATENT DOCUMENTS 6,765,369 B2 * 7/2004 Rhee ................. H02J 7/0063
                                                320/132
8,261,682 B1 * 9/2012 DeVito .............. G05D 1/0875
                                                701/21
(Continued)

FOREIGN PATENT DOCUMENTS

KR    10-1904986 B1    10/2018

OTHER PUBLICATIONS

Junho Kwak et al., "ICEr: An Intermittent Computing Environment Based on a Run-Time Module for Energy-Harvesting IoT Devices with NVRAM", Electronics 2021, 10, 879.

*Primary Examiner* — Xuxing Chen
(74) *Attorney, Agent, or Firm* — LRK PATENT LAW FIRM

(57) ABSTRACT

The power management method performed by the power management apparatus includes switching an operation mode of the power management apparatus from a standby mode to a normal mode when a voltage of the power management apparatus operating in the standby mode increases from a first upper limit value to a second upper limit value, switching the operation mode of the power management apparatus to a minimum operation mode when the voltage of the power management apparatus decreases to a first lower limit value while operating in the normal mode, switching the operation mode of the power management apparatus to a sleep mode when the voltage of the power management apparatus decreases to a second lower limit value while operating in the minimum operation mode, and switching the operation mode of the power management apparatus to the standby mode while operating in the sleep mode.

20 Claims, 7 Drawing Sheets

(56) References Cited

U.S. PATENT DOCUMENTS

| | | | |
|---|---|---|---|
| 8,963,404 B2 | 2/2015 | Lee et al. | |
| 9,340,116 B2 * | 5/2016 | Noiri | A47L 9/2805 |
| 9,618,963 B2 | 4/2017 | Kang et al. | |
| 10,061,376 B2 | 8/2018 | Naeimi et al. | |
| 10,320,576 B1 * | 6/2019 | Butler | H04L 12/10 |
| 2009/0292934 A1 * | 11/2009 | Esliger | G06F 1/3203 |
| | | | 713/323 |
| 2011/0291488 A1 * | 12/2011 | Paik | G01R 15/183 |
| | | | 307/104 |
| 2012/0019193 A1 * | 1/2012 | Yu | G06F 1/266 |
| | | | 320/103 |
| 2015/0181528 A1 * | 6/2015 | Yamauchi | H04W 52/0277 |
| | | | 370/311 |
| 2017/0164089 A1 * | 6/2017 | Lee | H04R 1/1025 |
| 2018/0101208 A1 * | 4/2018 | Kamijima | H02J 7/0031 |
| 2019/0094949 A1 * | 3/2019 | Kurian | G06F 1/3296 |
| 2019/0277977 A1 * | 9/2019 | Jackson | G01S 19/36 |
| 2021/0320518 A1 * | 10/2021 | Lee | H02J 7/0031 |
| 2022/0029429 A1 * | 1/2022 | Trippel | H02J 7/0047 |

* cited by examiner

POWER MANAGEMENT METHOD AND APPARATUS FOR AWARENESS OF POWER INSTABILITY SITUATION

CROSS-REFERENCE TO RELATED APPLICATIONS

This application claims the benefit of Korean Patent Application No. 10-2021-0173614 filed on Dec. 7, 2021, and Korean Patent Application No. 10-2022-0065302 filed on May 27, 2022, in the Korean Intellectual Property Office, the entire disclosures of which are incorporated herein by reference for all purposes.

BACKGROUND

1. Field of the Invention

One or more example embodiments relate to a power management method and apparatus for awareness of power instability situation.

2. Description of Related Art

An embedded device used to sense an environment has limitations in usage due to power supply and battery life. However, recently, an energy harvesting device which converts light energy, thermal energy, wind power, vibration, and the like into electrical energy has been developed. Therefore, devices using harvested energy as a power source are being developed. However, since the productivity of the energy harvesting device is flexible depending on environmental conditions, such as light and temperature differences, there is no guarantee that sufficient energy may be obtained at any time to read and transmit sensor information. Therefore, it is necessary to maintain sufficient energy to read and transmit sensor information.

SUMMARY

Example embodiments provide a power management method and apparatus for awareness of a power instability situation, the method and apparatus continuously detecting information through a sensor and performing communication by having another power management apparatus within a power management system perform the same operation, when any one of power management apparatuses is inoperable due to insufficient power, by using the power management system including a plurality of power management apparatuses.

Example embodiments provide a power management apparatus for managing power through a plurality of operation modes.

According to an aspect, there is provided a power management method performed by a power management apparatus, the power management method including switching an operation mode of the power management apparatus from a standby mode to a normal mode when a voltage of the power management apparatus operating in the standby mode increases from a first upper limit value to a second upper limit value, switching the operation mode of the power management apparatus to a minimum operation mode when the voltage of the power management apparatus decreases to a first lower limit value while operating in the normal mode, switching the operation mode of the power management apparatus to a sleep mode when the voltage of the power management apparatus decreases to a second lower limit value while operating in the minimum operation mode, and switching the operation mode of the power management apparatus to the standby mode when the voltage of the power management apparatus increases to the first upper limit value while operating in the sleep mode.

The power management method may further include transmitting a signal that the power management apparatus operates in the minimum operation mode to the power management apparatuses operating in the standby mode, when switching the operation mode of the power management apparatus to the minimum operation mode, The power management apparatuses operating in the standby mode may transmit information about amounts of stored power to other power management apparatuses operating in the standby mode when the signal is received.

A power management apparatus with a highest amount of stored power among the power management apparatuses operating in the standby mode which receives the information about the amounts of stored power may switch an operation mode from the standby mode to the normal mode.

The power management apparatus may generate a checkpoint which periodically updates a previous operation status in a memory when the power management apparatus operates in the minimum operation mode.

The checkpoint may be generated more frequently as the amount of power stored in the power management apparatus decreases.

The standby mode may include a mode in which the power management apparatus receives information about amounts of stored power from other power management apparatuses operating in the standby mode and stores generated power.

According to an aspect, there is provided a power management apparatus for performing a power management method, the power management apparatus including a processor. The processor may be configured to switch an operation mode of the power management apparatus from a standby mode to a normal mode when a voltage of the power management apparatus operating in the standby mode increases from a first upper limit value to a second upper limit value, switch the operation mode of the power management apparatus to a minimum operation mode when the voltage of the power management apparatus decreases to a first lower limit value while operating in the normal mode, switch the operation mode of the power management apparatus to a sleep mode when the voltage of the power management apparatus decreases to a second lower limit value while operating in the minimum operation mode, and switch the operation mode of the power management apparatus to the standby mode when the voltage of the power management apparatus increases to the first upper limit value while operating in the sleep mode.

The processor may be configured to transmit a signal that the power management apparatus operates in the minimum operation mode to the power management apparatuses operating in the standby mode, when switching the operation mode of the power management apparatus to the minimum operation mode.

The power management apparatuses operating in the standby mode may transmit information about amounts of stored power to other power management apparatuses operating in the standby mode when the signal is received.

A power management apparatus with a highest amount of stored power among the power management apparatuses operating in the standby mode which receives the information about the amounts of stored power may switch an operation mode from the standby mode to the normal mode.

The processor may be configured to generate a checkpoint which periodically updates a previous operation status in a memory when the power management apparatus operates in the minimum operation mode.

The checkpoint may be generated more frequently as the amount of power stored in the power management apparatus decreases.

The standby mode may include a mode in which the power management apparatus receives information about amounts of stored power from other power management apparatuses operating in the standby mode and stores generated power.

According to an aspect, there is provided a power management method performed by a power management system, the power management method including determining a power management apparatus operating in a normal mode among a plurality of power management apparatuses, switching an operation mode of the power management apparatus operating in the normal mode to a minimum operation mode when a voltage of the power management apparatus operating in the normal mode reaches a first lower limit value, determining a power management apparatus with a highest amount of stored power among all power management apparatuses operating in a standby mode when the voltage of the power management apparatus operating in the normal mode reaches the first lower limit value, and switching an operation mode of the power management apparatus with the highest amount of stored power among all power management apparatuses operating in the standby mode from the standby mode to the normal mode.

The determining of the power management apparatus with the highest amount of stored power among all the power management apparatuses operating in the standby mode may further include transmitting a signal that the operation mode of the power management apparatus operating in the normal mode is switched from the normal mode to the minimum operation mode to all the power management apparatuses operating in the standby mode when the operation mode of the power management apparatus operating in the normal mode is switched to the minimum operation mode, transmitting, by all the power management apparatuses operating in the standby mode, which receive the signal, information about amounts of stored power to other power management apparatuses operating in the standby mode except for the power management apparatuses operating in the standby mode themselves, and comparing, by a power management apparatus, which receives the information about the amounts of stored power, amounts of power stored in all the power management apparatuses operating in the standby mode.

The power management apparatus may operate in the normal mode until the voltage of the power management apparatus decreases from a second upper limit value to the first lower limit value.

The power management apparatus may operate in the minimum operation mode until the voltage of the power management apparatus decreases from the first lower limit value to a second lower limit value.

The power management apparatus may operate in a sleep mode until the voltage of the power management apparatus increases from a second lower limit value to a first upper limit value.

The power management apparatus may operate in a standby mode until the voltage of the power management apparatus increases from a first upper limit value to a second upper limit value.

Additional aspects of example embodiments will be set forth in part in the description which follows and, in part, will be apparent from the description, or may be learned by practice of the disclosure.

According to example embodiments, it is possible to continuously detect information through a sensor and perform communication by having another power management apparatus within a power management system perform the same operation when any one of the power management apparatus is inoperable due to insufficient power, by using a power system including a plurality of power management apparatuses.

According to example embodiments, provided is a power management apparatus for managing power through a plurality of operation modes.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
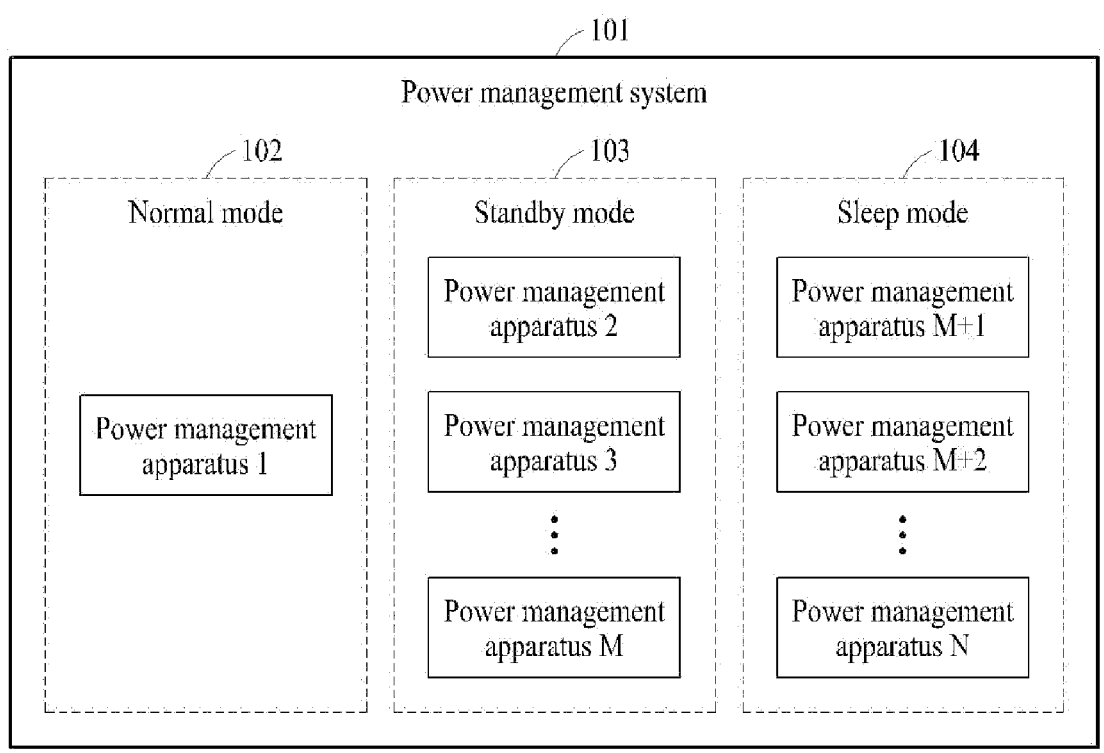
FIG. 1 is a diagram illustrating a power management system according to an example embodiment.

Hereinafter, example embodiments will be described in detail with reference to the accompanying drawings. The scope of the right, however, should not be construed as limited to the example embodiments set forth herein. In the drawings, like reference numerals are used for like elements.

Various modifications may be made to the example embodiments. Here, the example embodiments are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating a power management system according to an example embodiment.

Referring to FIG. 1, a power management system 101 including a plurality of power management apparatuses is illustrated. A power management apparatus included in a power management system may operate in any one of a normal mode, a standby mode, or a sleep mode. Here, there may be one power management apparatus operating in the normal mode.

Any one of the plurality of power management apparatuses included in the power management system 101 may operate in the normal mode. A power management apparatus 102 operating in the normal mode may sense the surrounding environment and perform wireless transmission. When voltage of the power management apparatus 102 operating in the normal mode decreases to a first lower limit value, an operation mode of the power management apparatus 102 operating in the normal mode may switch from the normal mode to a minimum operation mode. Here, the power management apparatus 102 switched to the minimum operation mode may transmit a signal for switching an operation mode of any one of power management apparatuses 103 operating in the standby mode to the normal mode, to the power management apparatuses 103 operating in the standby mode. When voltage of the power management apparatus operating in the minimum operation mode decreases to a second lower limit value, the power management apparatus may switch the operation mode from the minimum operation mode to the sleep mode.

The power management apparatuses 103 operating in the standby mode may include a power management apparatus 2 through a power management apparatus M. The power management apparatus 2 through the power management apparatus M may operate in the standby mode. In the standby mode, other operations may be stopped and an operation of receiving only a signal for switching from the standby mode to the normal mode may be performed. When the power management apparatuses 103 operating in the standby mode receives the signal for switching the operation mode to the normal mode, the operation mode of the power management apparatuses 103 may switch from the standby mode to the normal mode.

Accordingly, when the power management apparatus 2 through the power management apparatus M receive the signal, an operation mode of any one of the power management apparatus 2 through the power management apparatus M may switch from the standby mode to the normal mode.

Power management apparatuses 104 operating in the sleep mode may include a power management apparatus M+1 through a power management apparatus N. The power management apparatus M+1 through the power management apparatus N may operate in the sleep mode. In the sleep mode, the power management apparatuses 104 may no longer sense the surrounding environment or perform wireless transmission. However, in the sleep mode, the power management apparatus may harvest energy and store the energy in a battery. Accordingly, when voltage of the power management apparatus operating in the sleep mode reaches the first upper limit value, an operation mode of the power management apparatus may switch from the sleep mode to the standby mode.

As a result, in the power management system, when voltage of a power management apparatus 1 operating in the normal mode decreases to the first lower limit value, an operation mode of any one of the plurality of power management apparatuses operating in the standby mode may switch to the normal mode. As a result, the power management system may continuously sense the surrounding environment.

Hereinafter, a configuration of the power management apparatus included in the power management system is described.

Figure 2:
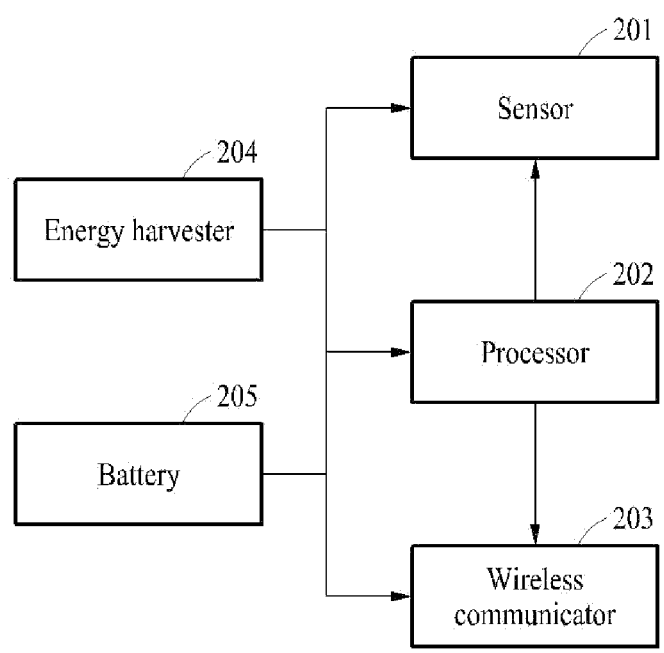
FIG. 2 is a diagram illustrating a configuration of a power management apparatus according to an example embodiment.

FIG. 2 is a diagram illustrating a configuration of a power management apparatus according to an example embodiment.

Referring to FIG. 2, the power management apparatus may include a sensor 201, a processor 202, a wireless communicator 203, an energy harvester 204, and a battery 205.

The energy harvester 204 may produce electrical energy from an external energy source. The energy harvester 204 may produce electrical energy through solar heat, solar light, wind power, and vibration. The electrical energy produced by the energy harvester 204 may be transmitted to the sensor 201, the processor 202, and the wireless communicator 203 for the operation of the power management apparatus. In addition, the electrical energy produced by the energy harvester 204 may be stored in the battery 205.

The sensor 201 may include a plurality of sensors. The sensor 201 may measure the state of the surrounding environment through a sensor.

The wireless communicator 203 may transmit data about the surrounding environment measured by the sensor 201. When the voltage of the power management apparatus decreases to or less than the first lower limit value, the wireless communicator 203 may generate a signal for switching the operation mode of other power management apparatuses operating in the standby mode. When the voltage of the power management apparatus decreases to or less than the first lower limit value, the wireless communicator 203 may receive a signal for switching the operation mode of other power management apparatuses operating in the standby mode.

The processor 202 may control the sensor 201 and the wireless communicator 203. The processor 202 may determine the operation mode of the power management apparatus. The processor 202 may switch the operation mode of the power management apparatus based on the voltage of the power management apparatus. The processor 202 may compare the amounts of power based on the information about the amounts of power stored in other power management apparatuses received from the wireless communicator 203. The processor 202 may switch the operation mode of the power management apparatus from the standby mode to the normal mode based on a signal for switching the operation mode from the standby mode to the normal mode received from the wireless communicator 203.

The battery 205 may store the electrical energy produced by the energy harvester 204. When the energy harvester 204 is unable to produce electrical energy, the battery 205 may supply the stored electrical energy to the sensor 201, the processor 202, and the wireless communicator 203.

Hereinafter, a method of managing power of a power management apparatus is described.

Figure 3:
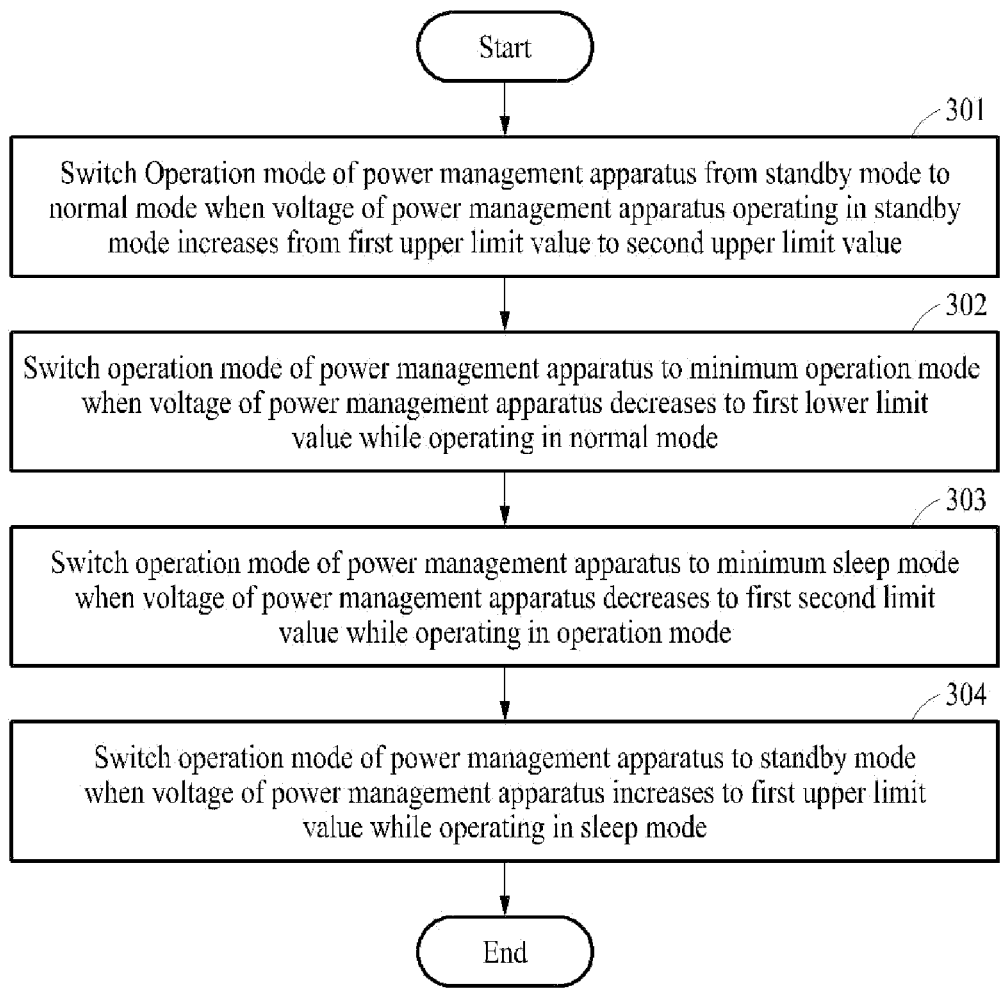
FIG. 3 is a flowchart illustrating a power management method of a power management apparatus according to an example embodiment.

FIG. 3 is a flowchart illustrating a power management method of a power management apparatus according to an example embodiment.

In operation 301, the power management apparatus may switch the operation mode of the power management apparatus from the standby mode to the normal mode when the voltage of the power management apparatus operating in the standby mode increases from the first upper limit value to a second upper limit value.

The power management apparatus operating in the standby mode may continuously generate energy in the energy harvester 204. Accordingly, since the electrical energy generated by the energy harvester 204 may be stored in the battery 205, the voltage of the power management apparatus operating in the standby mode may increase. When the voltage of the power management apparatus operating in the standby mode increases to the second upper limit value, the power management apparatus may switch the operation mode from the standby mode to the normal mode. When the power management apparatus receives a signal for switching the operation mode from the standby mode to the normal mode while the power management apparatus operates in the standby mode, the power management apparatus may switch the operation mode to the normal mode.

In operation 302, when the voltage of the power management apparatus decreases to the first lower limit value while the power management apparatus operates in the normal mode, the power management apparatus may switch the operation mode of the power management apparatus to the minimum operation mode.

The power management apparatus may sense the surrounding environment in the normal mode and perform operations, such as wireless transmission and receival of data, with another power management apparatus. Accordingly, the power management apparatus may consume stored electrical energy by performing operations, such as sensing and communication in the normal mode. When the power management apparatus consumes electrical energy and the voltage of the power management apparatus decreases to the first lower limit value, the power management apparatus may switch the operation mode to the minimum operation mode.

The minimum operation mode is a state in which the operation of the power management apparatus may stop any time due to insufficient electrical energy. Accordingly, the power management apparatus may generate a checkpoint in the minimum operation mode. When the operation of the power management apparatus stops due to insufficient power and is later restored, the checkpoint may be data which enables restoration to the previous operation state.

When the operation mode switches to the minimum operation mode, the power management apparatus may transmit a signal indicating that the power management apparatus operates in the minimum operation mode, to other power management apparatuses operating in the standby mode. The signal for operating in the minimum operation mode may be a signal for switching the operation mode from the standby mode to the normal mode.

In operation 303, the power management apparatus may switch the operation mode of the power management apparatus to the sleep mode when the voltage of the power management apparatus decreases to the second lower limit value while operating in the minimum operation mode.

The power management apparatus does not operate in the sleep mode. In the sleep mode, the power management apparatus may be turned off. Accordingly, in the sleep mode, the power management apparatus may not be capable of sensing the surrounding environment or communicate with other power management apparatuses. In the sleep mode, the power management apparatus may generate electrical energy through the energy harvester 204 and store the electrical energy in the battery 205. Accordingly, in the sleep mode, the power management apparatus may only store power. In the sleep mode, the voltage of the power management apparatus may increase.

In operation 304, the power management apparatus may switch the operation mode of the power management apparatus to the standby mode when the voltage of the power management apparatus increases to the first upper limit value while operating in the sleep mode.

The standby mode is a mode in which the power management apparatus stands by to operate in the normal mode. The power management apparatus may wirelessly receive only data in the standby mode. Data received by the power management apparatus operating in the standby mode may be a signal for switching from the standby mode to the normal mode. The signal for switching from the standby mode to the normal mode may be a signal that the operation mode of the power management apparatus operating in the normal mode switched to the minimum operation mode.

When the power management apparatus operating in the standby mode receives a signal for switching from the standby mode to the normal mode, the power management apparatus receiving the signal may transmit the information about the amount of stored power to other power management apparatuses operating in the standby mode.

The other power management apparatuses operating in the standby mode that receive the information about the amount of power may compare the information about the amounts of stored power. By comparing the information about the amounts of stored power, the power management apparatus operating in the standby mode storing the highest amount of power may switch the operation mode to the normal mode.

Hereinafter, four operation modes of the power management apparatus are described.

Figure 4:
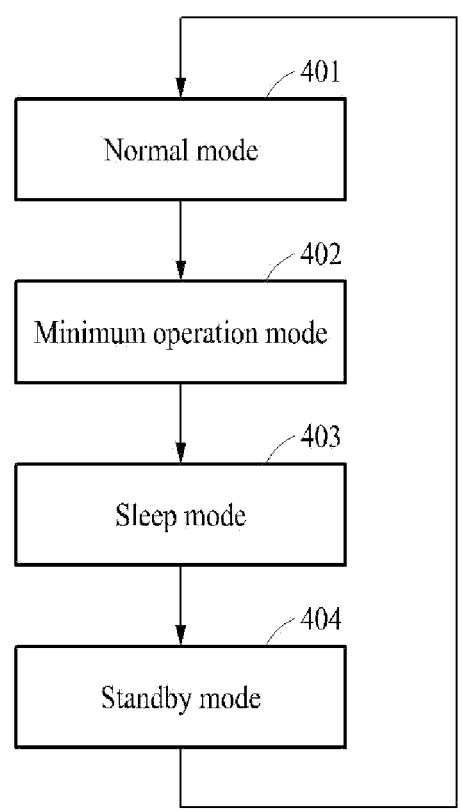
FIG. 4 is a block diagram illustrating an operation mode of a power management apparatus according to an example embodiment.

FIG. 4 is a block diagram illustrating an operation mode of a power management apparatus according to an example embodiment.

Referring to FIG. 4, the power management apparatus may operate in a normal mode 401, a minimum operation mode 402, a sleep mode 403, and a standby mode 404.

The power management apparatus may switch the operation mode from the normal mode 401 to the minimum operation mode 402. The power management apparatus may switch the operation mode from the minimum operation mode 402 to the sleep mode 403. The power management apparatus may switch the operation mode from the sleep mode 403 to the standby mode 404. The power management apparatus may switch the operation mode from the standby mode 404 to the normal mode 401. That is, the power management apparatus may switch the operation mode in the order of the normal mode 401, the minimum operation mode 402, the sleep mode 403, and the standby mode 404. The power management apparatus may repeat the normal mode 401, the minimum operation mode 402, the sleep mode 403, and the standby mode 404.

Hereinafter, the relationship between the voltage and the operation mode of the power management apparatus is described.

Figure 5:
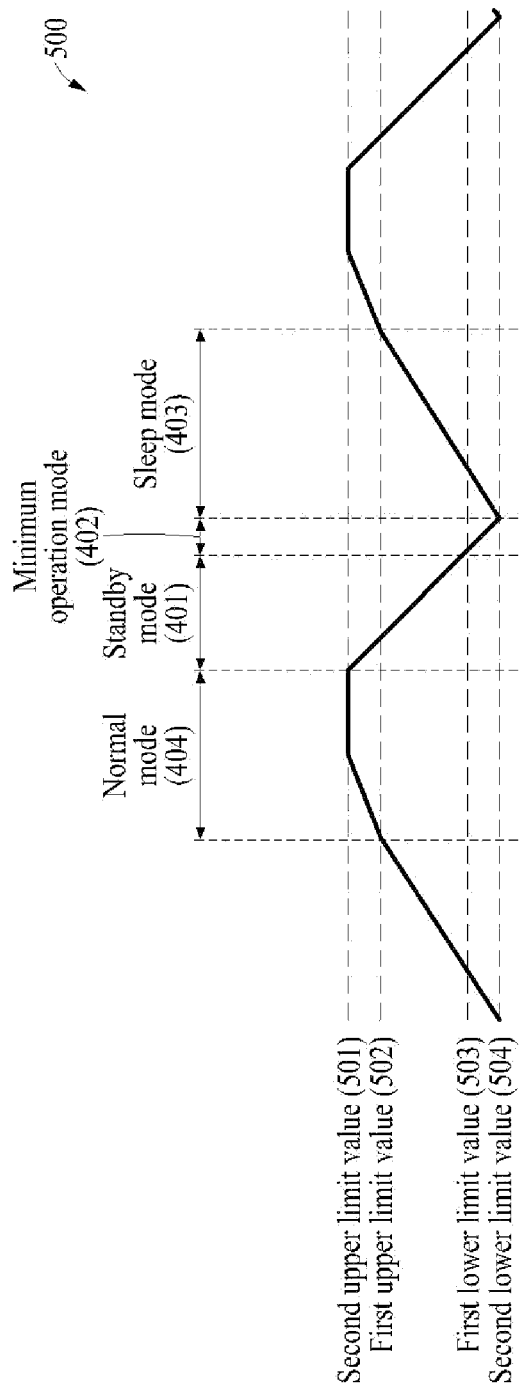
FIG. 5 is a diagram illustrating a voltage of a power management apparatus according to an operation mode of the power management apparatus according to an example embodiment.

FIG. 5 is a diagram illustrating the voltage of the power management apparatus according to the operation mode of the power management apparatus according to an example embodiment.

The power management apparatus may operate in the normal mode 401 until the voltage of the power management apparatus decreases from a second upper limit value 501 to a first lower limit value 503. In the normal mode 401, the power management apparatus may perform sensing, communication, and processing. Accordingly, the power management apparatus may consume power. As the power management apparatus consumes power, the voltage of the power management apparatus may decrease. In the normal mode 401, when the voltage of the power management apparatus decreases from the second upper limit value 501 to the first lower limit value 503, the power management apparatus may switch the operation mode from the normal mode 401 to the minimum operation mode 402.

The power management apparatus may operate in the minimum operation mode 402 until the voltage of the power management apparatus decreases from the first lower limit value 503 to a second lower limit value 504. In the minimum operation mode 402, the power management apparatus may stop operating any time due to insufficient power. Accordingly, when the operation of the power management apparatus stops, the power management apparatus may periodically generate a checkpoint to restore the previous operation of the power management apparatus. The power management apparatus may generate a checkpoint to store information, such as a program counter, a register, and an active memory in a non-volatile memory. A period in which the power management apparatus generates the checkpoint may be based on the voltage of the power management apparatus. The lower the voltage of the power management apparatus, the more likely the power management apparatus stops operating. Accordingly, the power management apparatus may generate checkpoints more frequently as the voltage of the power management apparatus decreases. When the voltage of the power management apparatus in the minimum operation mode 402 decreases from the first lower limit value 503 to the second lower limit value 504, the power management apparatus may switch the operation mode from the minimum operation mode 402 to the sleep mode 403.

The power management apparatus may operate in the sleep mode 403 until the voltage of the power management apparatus increases from the second lower limit value 504 to the second upper limit value 501. The sleep mode 403 is a state in which the power management apparatus no longer operates. In the sleep mode 403, the power management apparatus does not perform operations, such as sensing, communication, and processing. In the sleep mode 403, the power management apparatus may generate power through the energy harvester 204 and store the power in the battery 205. Accordingly, the voltage of the power management apparatus may increase in the sleep mode 403. In the sleep mode 403, when the voltage of the power management apparatus increases from the second lower limit value 504 to the first upper limit value 502, the power management apparatus switches the operation mode from the sleep mode 403 to the standby mode 404.

The power management apparatus may operate in the standby mode 404 until the voltage of the power management apparatus increases from the first upper limit value 502 to the second upper limit value 501. In the standby mode 404, the power management apparatus may generate power through the energy harvester 204 and store the power in the battery 205, so the voltage of the power management apparatus may increase. When the voltage of the power management apparatus reaches the second upper limit value 501 in the standby mode 404, the power management apparatus may no longer produce power in the energy harvester 204 and may maintain the voltage of the power management apparatus at the second upper limit value 501. In the standby mode 404, the power management apparatus may perform only communication without sensing and processing. In the standby mode 404, the power management apparatus may receive a signal for switching from the standby mode 404 to the normal mode 401. The signal for switching from the standby mode 404 to the normal mode 401 may be a signal that the operation mode of another power management apparatus that was operating in the normal mode 401 switched to the minimum operation mode 402. When the power management apparatus receives a signal for switching from the standby mode 404 to the normal mode 401, the power management apparatus may switch the operation mode from the standby mode 404 to the normal mode 401.

Hereinafter, a power management method of a power management system, in which a plurality of power management apparatuses forms a cluster, is described.

Figure 6:
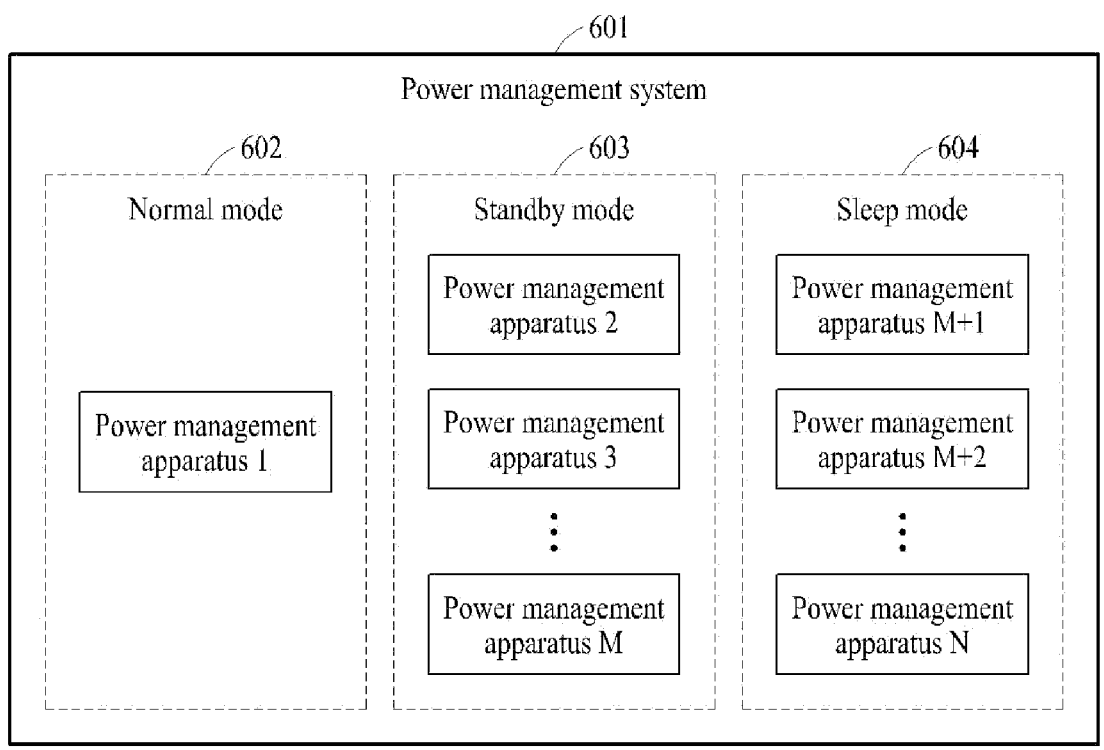
FIG. 6 is a diagram illustrating a power management system according to an example embodiment.

FIG. 6 is a diagram illustrating a power management system according to an example embodiment.

Referring to FIG. 6, a power management system 601 is illustrated. The power management system 601 may be the power management system 101 of FIG. 1. The power management system 601 may include a power management apparatus 602 operating in the normal mode 401, a plurality of power management apparatuses 603 operating in the standby mode 404, and a plurality of power management apparatuses 604 operating in the sleep mode 403. The power management apparatus 602 operating in the normal mode 401 may be the power management apparatus 102 operating in the normal mode 401 of FIG. 1. The power management apparatuses 603 operating in the standby mode 404 may be the power management apparatuses 103 operating in the standby mode 404 of FIG. 1. The plurality of power management apparatuses 604 operating in the sleep mode 403 may be the power management apparatuses 104 operating in the sleep mode 403 of FIG. 1.

The power management system 601 may include a plurality of power management apparatuses. A power management apparatus included in the power management system 601 may operate in the operation mode described with reference to FIGS. 4 to 5 according to the voltage of the power management apparatus.

Referring to FIG. 6, the power management apparatus 1 may be a power management apparatus 602 operating in the normal mode 401.

There may be one power management apparatus 602 operating in the normal mode 401 in the power management system. The power management apparatus 2 through the power management apparatus M may be the plurality of power management apparatuses 603 operating in the standby mode 404. The power management apparatus M+1 through the power management apparatus N may be the plurality of power management apparatuses 604 operating in the sleep mode 403. N and M may be natural numbers. Hereinafter, the operation of the power management system 601 is described.

First, the power management system 601 may determine the power management apparatus 602 operating in the normal mode 401 for sensing the surrounding environment and performing wireless communication from among a plurality of power management apparatuses included in the power management system 601. The power management system 601 may determine the power management apparatus having a highest amount of power among the plurality of power management apparatuses included in the power management system 601 to operate in the normal mode 401.

The plurality of power management apparatuses included in the power management system 601 may transmit and receive data through wireless communication. Data transmitted and received by the plurality of power management apparatuses may include information about an amount of power of each apparatus. The power management apparatus receiving information about amounts of power of the power management apparatuses may determine the power management apparatus to operate in the normal mode 401 based on the information about the amounts of power. Referring to FIG. 6, it is determined that the power management apparatus 1 operates in the normal mode 401.

The power management apparatus 2 through the power management apparatus N may determine an initial operation mode based on the voltage of the power management apparatus. If the voltage of the power management apparatus is within the second lower limit value 504 through the first upper limit value 502, the power management apparatus may operate in the sleep mode 403. If the voltage of the power management apparatus is within the first upper limit value 502 through the second upper limit value 501, the power management apparatus may operate in the standby mode 404. Referring to FIG. 6, the power management apparatus 2 through the power management apparatus M may operate in the standby mode 404. The power management apparatus M+1 through the power management apparatus N may operate in the sleep mode 403.

The power management apparatus 1 may consume power stored in the power management apparatus 1 by sensing the surrounding environment, performing wireless communication, or performing processing while operating in the normal mode 401. When the power of the power management apparatus 1 is consumed, the voltage of the power management apparatus 1 may decrease. The power management apparatus 1 may operate in the normal mode 401 from the second upper limit value 501 to the first lower limit value 503.

When the voltage of the power management apparatus 1 decreases and reaches the first lower limit value 503, the power management apparatus 1 may switch the operation mode from the normal mode 401 to the minimum operation mode 402. When the power management apparatus 1 operates in the minimum operation mode 402, the power management apparatus 1 may transmit a signal indicating that the power management apparatus 1 is operating in the minimum operation mode 402 to the plurality of power management apparatuses 603 operating in the standby mode 404. That is, the power management apparatus 1 may transmit a signal for switching the operation mode to the normal mode 401 to the plurality of power management apparatuses 603 operating in the standby mode 404.

When the plurality of power management apparatuses 603 operating in the standby mode 404 receives the signal indicating that the power management apparatus 1 is operating in the minimum operation mode 402, the plurality of power management apparatuses 603 operating in the standby mode 404 may determine a power management apparatus to operate in the normal mode 401 among the power management apparatuses from the power management apparatus 2 through the power management apparatus M.

When the power management apparatus operating in the standby mode 404 receives the signal from the power management apparatus 1 that the power management apparatus 1 is operating in the minimum operation mode 402, the power management apparatus operating in the standby mode 404 which receives the signal may transmit information about the amount of power stored in the power management apparatus operating in the standby mode 404 which receives the signal to other power management apparatuses operating in the standby mode 404. For example, when the power management apparatus 2 operating in the standby mode 404 receives a signal, the power management apparatus 2 may transmit the information about the amount of power stored in the power management apparatus 2 to the power management apparatus 3 through the power management apparatus M.

All power management apparatuses operating in the standby mode 404 may transmit the information about the amount of power stored in the power management apparatus themselves to other power management apparatuses operating in the standby mode 404 except for themselves. Accordingly, all power management apparatuses operating in the standby mode 404 may collect the information about the amounts of power of other power management apparatuses operating in the standby mode 404, in addition to the information about the amount of power of themselves.

The power management apparatus operating in the standby mode 404 may compare the information about the amount of power stored in the power management apparatus operating in the standby mode 404 itself with the received information about the amounts of power. As a result of comparing the information about the amounts of power, the power management apparatus operating in the standby mode 404 storing the highest amount of power may switch the operation mode from the standby mode 404 to the normal mode 401.

For example, when the power management apparatus 2 compares its own information about the amount of power with the received information about the amount of power of the power management apparatus 3 through the power management apparatus M and the amount of power stored in the power management apparatus 2 is the highest, the power management apparatus 2 may switch the operation mode from the standby mode 404 to the normal mode 401. The power management apparatus 3 through the power management apparatus M may still operate in the standby mode 404.

At this time, the power management apparatus, which operated in the normal mode 401, may operate in the minimum operation mode 402, and the power management apparatus, which operated in the standby mode 404, may operate in the normal mode 401, so the two power management apparatuses may operate at the same time. However, when the power management apparatus which operated in the normal mode 401 operates in the minimum operation mode 402 and reaches the second lower limit value 504, the operation mode switches to the sleep mode 403 and the power management apparatus stops operating immediately, so only the power management apparatus which operated in the standby mode 404 may operate in the normal mode 401 to perform sensing and other operations.

The plurality of power management apparatuses 604 operating in the sleep mode 403 may generate power in the energy harvester 204. The plurality of power management apparatuses 604 operating in the sleep mode 403 may store the power generated by the energy harvester 204 in the battery 205. Accordingly, voltages of the plurality of power management apparatuses 604 operating in the sleep mode 403 may increase. When the voltages of the power management apparatuses operating in the sleep mode 403 reach the first upper limit value 502, the operation mode may switch from the sleep mode 403 to the standby mode 404.

Figure 7:
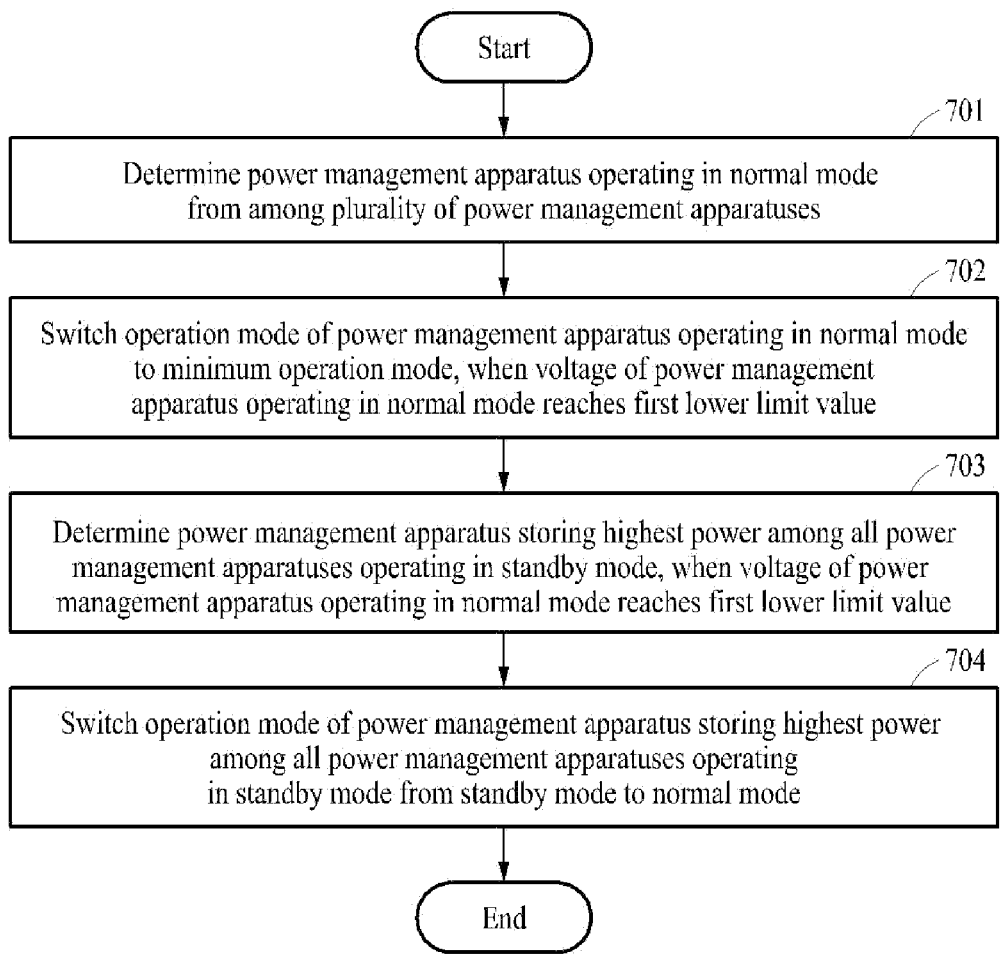
FIG. 7 is a flowchart illustrating a power management method of a power management system according to an example embodiment.

FIG. 7 is a flowchart illustrating a power management method of a power management system according to an example embodiment.

In operation 701, the power management system 601 may determine a power management apparatus operating in a normal mode from among a plurality of power management apparatuses.

The power management system 601 may include a plurality of power management apparatuses. The power management system 601 may determine a power management apparatus having the highest amount of power among the power management apparatuses to operate in the normal mode 401.

In operation 702, the power management system 601 may switch the operation mode of the power management apparatus operating in the normal mode 401 to the minimum operation mode 402, when the voltage of the power management apparatus operating in the normal mode 401 reaches the first lower limit value 503.

In operation 703, the power management system 601 may determine a power management apparatus storing the highest power among all the power management apparatuses operating in the standby mode 404, when the voltage of the power management apparatus operating in the normal mode 401 reaches the first lower limit value 503.

When the operation mode of the power management apparatus operating in the normal mode 401 switches to the minimum operation mode 402, the power management apparatus with the switched operation mode may transmit a signal that the operation mode of the power management apparatus operating in the normal mode 401 switched from the normal mode 401 to the minimum operation mode 402, to all power management apparatuses operating in the standby mode 404.

All power management apparatuses operating in the standby mode 404 that receives the signal may transmit the information about the amount of stored power to other power management apparatuses operating in the standby mode 404 except for themselves.

The power management apparatus that receives the information about the amounts of stored power may compare the amounts of power stored in all power management apparatuses operating in the standby mode.

In operation 704, the power management system 601 may switch the operation mode of the power management apparatus storing the highest power among all the power management apparatuses operating in the standby mode 404 from the standby mode 404 to the normal mode 401.

By comparing the amounts of stored power, the power management apparatus that stores the highest power may switch the operation mode from the standby mode 404 to the normal mode 401.

In this case, the plurality of power management apparatuses included in the power management system 601 performing the power management method described with reference to FIG. 7 may operate in the operation mode described with reference to FIGS. 4 to 5 according to the voltages of the power management apparatuses.

Accordingly, the plurality of power management apparatuses included in the power management system 601 may operate in the normal mode 401 until the voltage decreases from the second upper limit value 501 to the first lower limit value 503.

The plurality of power management apparatuses included in the power management system 601 may operate in the minimum operation mode 402 until the voltage decreases from the first lower limit value 503 to the second lower limit value 504.

The plurality of power management apparatuses included in the power management system 601 may operate in the sleep mode 403 until the voltage increases from the second lower limit value 504 to the first upper limit value 502.

The plurality of power management apparatuses included in the power management system 601 may operate in the standby mode 404 until the voltage increases from the first upper limit value 502 to the second upper limit value 501.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A power management method performed by a power management apparatus, the power management method comprising:
    switching an operation mode of the power management apparatus from a standby mode to a normal mode when a voltage of the power management apparatus is included in a first upper limit value to a second upper limit value and an amount of power of the power management apparatus is a highest among power management apparatuses operating in the standby mode;
    switching the operation mode of the power management apparatus to a minimum operation mode when the voltage of the power management apparatus decreases to a first lower limit value while operating in the normal mode;
    switching the operation mode of the power management apparatus to a sleep mode when the voltage of the power management apparatus decreases to a second lower limit value while operating in the minimum operation mode; and
    switching the operation mode of the power management apparatus to the standby mode when the voltage of the power management apparatus increases to the first upper limit value while operating in the sleep mode.

2. The power management method of claim 1, wherein the switching the operation mode of the power management apparatus to a minimum operation mode comprises:
    transmitting a signal that the power management apparatus operates in the minimum operation mode to the power management apparatuses operating in the standby mode, when switching the operation mode of the power management apparatus to the minimum operation mode.

3. The power management method of claim 2, wherein the power management apparatuses operating in the standby mode transmit information about amounts of stored power to other power management apparatuses operating in the standby mode when the signal is received.

4. The power management method of claim 3, wherein a power management apparatus with a highest amount of stored power among the power management apparatuses operating in the standby mode which receives the information about the amounts of stored power switches an operation mode from the standby mode to the normal mode.

5. The power management method of claim 1, wherein the power management apparatus generates a checkpoint which periodically updates a previous operation status in a memory when the power management apparatus operates in the minimum operation mode.

6. The power management method of claim 5, wherein the checkpoint is generated more frequently as the amount of power stored in the power management apparatus decreases.

7. The power management method of claim 1, wherein the standby mode includes a mode in which the power management apparatus receives information about amounts of stored power from other power management apparatuses operating in the standby mode and stores generated power.

8. A power management apparatus for performing a power management method, the power management apparatus comprising a processor,
    wherein the processor is configured to:
        switch an operation mode of the power management apparatus from a standby mode to a normal mode when a voltage of the power management apparatus is included in a first upper limit value to a second upper limit value and an amount of power of the power management apparatus is a highest among power management apparatuses operating in the standby mode;

switch the operation mode of the power management apparatus to a minimum operation mode when the voltage of the power management apparatus decreases to a first lower limit value while operating in the normal mode;

switch the operation mode of the power management apparatus to a sleep mode when the voltage of the power management apparatus decreases to a second lower limit value while operating in the minimum operation mode; and switch the operation mode of the power management apparatus to the standby mode when the voltage of the power management apparatus increases to the first upper limit value while operating in the sleep mode.

9. The power management apparatus of claim 8, wherein the processor is configured to transmit a signal that the power management apparatus operates in the minimum operation mode to the power management apparatuses operating in the standby mode, when switching the operation mode of the power management apparatus to the minimum operation mode.

10. The power management apparatus of claim 9, wherein the power management apparatuses operating in the standby mode transmit information about amounts of stored power to other power management apparatuses operating in the standby mode when the signal is received.

11. The power management apparatus of claim 10, wherein a power management apparatus with a highest amount of stored power among the power management apparatuses operating in the standby mode which receives the information about the amounts of stored power switches an operation mode from the standby mode to the normal mode.

12. The power management apparatus of claim 8, wherein the processor is configured to generate a checkpoint which periodically updates a previous operation status in a memory when the power management apparatus operates in the minimum operation mode.

13. The power management apparatus of claim 12, wherein the checkpoint is generated more frequently as the amount of power stored in the power management apparatus decreases.

14. The power management apparatus of claim 8, wherein the standby mode includes a mode in which the power management apparatus receives information about amounts of stored power from other power management apparatuses operating in the standby mode and stores generated power.

15. A power management method performed by a power management system, the power management method comprising:

determining a power management apparatus operating in a normal mode among a plurality of power management apparatuses;

switching an operation mode of the power management apparatus operating in the normal mode to a minimum operation mode when a voltage of the power management apparatus operating in the normal mode reaches a first lower limit value;

determining a power management apparatus with a highest amount of stored power among all power management apparatuses operating in a standby mode when the voltage of the power management apparatus operating in the normal mode reaches the first lower limit value; and switching an operation mode of the power management apparatus with the highest amount of stored power among all power management apparatuses operating in the standby mode from the standby mode to the normal mode.

16. The power management method of claim 15, wherein the determining of the power management apparatus with the highest amount of stored power among all the power management apparatuses operating in the standby mode further comprises:

transmitting a signal that the operation mode of the power management apparatus operating in the normal mode is switched from the normal mode to the minimum operation mode to all the power management apparatuses operating in the standby mode when the operation mode of the power management apparatus operating in the normal mode is switched to the minimum operation mode;

transmitting, by all the power management apparatuses operating in the standby mode, which receive the signal, information about amounts of stored power to other power management apparatuses operating in the standby mode except for the power management apparatuses operating in the standby mode themselves; and comparing, by a power management apparatus, which receives the information about the amounts of stored power, amounts of power stored in all the power management apparatuses operating in the standby mode.

17. The power management method of claim 15, wherein the power management apparatus operates in the normal mode until the voltage of the power management apparatus decreases from a second upper limit value to the first lower limit value.

18. The power management method of claim 15, wherein the power management apparatus operates in the minimum operation mode until the voltage of the power management apparatus decreases from the first lower limit value to a second lower limit value.

19. The power management method of claim 15, wherein the power management apparatus operates in a sleep mode until the voltage of the power management apparatus increases from a second lower limit value to a first upper limit value.

20. The power management method of claim 15, wherein the power management apparatus operates in a standby mode until the voltage of the power management apparatus increases from a first upper limit value to a second upper limit value.

* * * * *